United States Patent [19]

Inoue et al.

[11] 4,245,853
[45] Jan. 20, 1981

[54] INDEPENDENT WHEEL SUSPENSION FOR MOTOR VEHICLES

[75] Inventors: Hitoshi Inoue; Kenichi Watanabe; Takashi Sumimoto, all of Hiroshima, Japan

[73] Assignee: Toyo Kogyo Co., Ltd., Hiroshima, Japan

[21] Appl. No.: 40,082

[22] Filed: May 17, 1979

[30] Foreign Application Priority Data

Sep. 14, 1978 [JP] Japan ............................ 53-126796[U]

[51] Int. Cl.³ ............................................. B60G 3/00
[52] U.S. Cl. ................................ 280/701; 180/73 TL; 280/725
[58] Field of Search ............... 280/690, 688, 689, 701, 280/724, 725, 726; 180/73 TL, 73 TT

[56] References Cited

U.S. PATENT DOCUMENTS

| 3,759,542 | 9/1973 | Loffler | 280/690 |
| 3,893,701 | 7/1975 | Kroniger | 280/690 |

FOREIGN PATENT DOCUMENTS 2249913 4/1974 Fed. Rep. of Germany ........... 280/725
2543189 4/1977 Fed. Rep. of Germany ........... 280/690

Primary Examiner—John J. Love
Assistant Examiner—Ross Weaver
Attorney, Agent, or Firm—Wenderoth, Lind & Ponack

[57] ABSTRACT

A wheel suspension for a motor vehicle having a vehicle chassis comprises a wheel carrier having a journal for the support of a wheel for rotation independently of the wheel carrier, and first and second arms for supporting the wheel carrier to the vehicle chassis and extending in spaced relation to each other with the space therebetween gradually increasing as they extend outwardly from the wheel carrier towards the vehicle chassis. The wheel suspension further comprises a connecting member for elastically connecting the wheel carrier to the vehicle chassis for the displacement in a direction generally perpendicular to the widthwise direction of the vehicle chassis, and a shock absorber for absorbing vibration of the wheel carrier. The journal extends outwardly from the wheel carrier at a position spaced a smaller distance from the joint of the first arm to the wheel carrier than from the joint of the second arm to the wheel carrier.

3 Claims, 5 Drawing Figures

INDEPENDENT WHEEL SUSPENSION FOR MOTOR VEHICLES

BACKGROUND OF THE INVENTION

The present invention generally relates to a vehicle wheel suspension system and, more particularly, to an independent rear wheel suspension for motor vehicles.

The Japanese Laid-open Patent Publication laid open to public inspection under No. 49-26921 in 1974 discloses a vehicle rear wheel suspension of a construction shown in FIG. 1 of the accompanying drawings. Referring to FIG. 1 of the accompanying drawings, wherein the only left-hand rear wheel and its suspension are diagrammatically shown as viewed from top of a vehicle, the prior art rear wheel suspension comprises a wheel carrier 1 having a wheel journal for the support of a rear wheel 2 for rotation independently of the wheel carrier 1 and operatively coupled to a vehicle superstructure, particularly, a chassis 4, by means of an arm member 3 which extends in a direction generally transversely of the vehicle superstructure and is operatively interposed between the wheel carrier 1 and the chassis 4. The arm member 3 is comprised of a stub 3a and a pair of forked front and rear arms 3b and 3c, it being understood that the terms "front" and "rear" referred to above and hereinafter throughout the specification and the appended claims are used to denote respective positions defined in terms of the vehicle superstructure. The stub 3a has a free end hingedly and yieldingly connected to a lateral portion of the chassis 4 while respective free ends of the front and rear arms 3b and 3c, which are forked from the stub 3a, are hingedly and yieldingly connected at A and B to front and rear portions of the wheel carrier 1 by the intervention of associated rubber bushings. The prior art rear wheel suspension further comprises a tension rod 5 having one end hingedly and yieldingly connected to a front portion of the chassis 4 and the other end hingedly and yieldingly connected to a portion of the arm 3b adjacent the wheel carrier 1.

The prior art rear wheel suspension of the construction shown in FIG. 1 involves such a disadvantage that the wheel 2 tends to toe out particularly during the cornering of the vehicle, that is, during the turn of the vehicle in a direction either leftwards or rightwards. More specifically, during the cornering of the vehicle along a curve, the outer wheel rotates on or follows a larger radius than the inner wheel with the increased pressure of contact of the outer wheel on the road surface while the vehicle superstructure tilts laterally under the influence of centrifugal force and, at this time, the various elastic bushings used at the various joints of the arm member 3 are elastically deformed to such an extent as to increase the tendency of the wheel to toe out. This results in an over-steerability, that is, the steering stability is adversely affected. This equally happens even when the wind blows the vehicle in a direction transversely of the vehicle during the running of the vehicle.

A rear wheel suspension wherein the front and rear arms, corresponding to the arms 3b and 3c shown in FIG. 1, extends from the wheel carrier in substantially parallel relation to each other to different lateral portions of the vehicle chassis is also well known and is disclosed, for example, in the Japanese Patent Publication No. 51-21494, published for opposition on July 2, 1976. Even this rear axle suspension of a type disclosed in the Japanese Patent Publication involves disadvantages similar to that described in connection with the rear wheel suspension of the construction shown in FIG. 1.

The rear wheel suspension wherein the front and rear arms, which are separate from each other, have different lengths and extend in parallel or approximately parallel relation to each other is disclosed in the U.S. Pat. No. 3,759,542, patented on Sept. 18, 1973. With the construction disclosed in this U.S. patent, for a slight displacement of the wheel, the tendency of the wheel to toe in is small. Where the amount of the toe-in of the wheel is desired to be increased, the difference in length between the front and rear arms must be large for a limited space available for the installation of the axle suspension.

SUMMARY OF THE INVENTION

Accordingly, the present invention has been made in view to substantially eliminating the disadvantages and inconveniences inherent in the prior art rear wheel suspension and has for its essential object to provide an improved rear wheel suspension for motor vehicles wherein the tendency of the wheel to toe in is enhanced.

Another object of the present invention is to provide an improved rear wheel suspension wherein, even if the wheel carrier is rendered easy to displace relative to the vehicle chassis for improving the riding quality, the steering stability will not adversely be affected.

A further object of the present invention is to provide an improved rear wheel suspension with which both a good steering stability and a good riding quality can be appreciated.

A still further object of the present invention is to provide an improved rear wheel suspension which requires neither an increased manufacturing cost nor a relatively large space for installation thereof.

To this end, the present invention provides an improved independent rear wheel suspension which comprises a wheel support including a wheel carrier, having a wheel journal or axle for the support of a wheel for rotation independently of the wheel carrier, and front and rear arms positioned between the wheel carrier and the vehicle chassis in spaced relation to each other, said front arm being located frontwardly of the rear arm with respect to the direction towards the front of the vehicle. The front arm has one end hingedly and yieldingly connected to a front portion of the wheel carrier and the other end hingedly and yieldingly connected to a front lateral portion of the vehicle chassis whereas the rear arm has one end hingedly and yieldingly connected to a rear portion of the wheel carrier and the other end hingedly and yieldingly connected to a rear lateral portion of the vehicle chassis. These front and rear arms may extend outwardly from the wheel carrier so as to diverge from each other and, in this case, the distance as measured in a direction parallel to the longitudinal axis of the vehicle chassis between the first vertical plane generally perpendicular to the longitudinal axis of the vehicle chassis in which the joint of the one end of the front arm to the front portion of the wheel carrier lies and the second vertical plane parallel to the first vertical plane in which the joint of the one end of the rear arm to the rear portion of the wheel carrier lies is smaller than the distance as measured in a direction parallel to the longitudinal axis of the vehicle chassis between the third vertical plane generally perpendicular to the longitudinal axis of the vehicle chassis in which the joint of the other end of the front arm to the front lateral portion of the vehicle chassis lies and the fourth vertical plane parallel to any one of the first to third vertical planes in which the joint of the other end of the rear arm to the rear lateral portion of the vehicle chassis lies.

The improved wheel suspension further comprises a connecting member for elastically connecting the wheel support to the vehicle chassis for the displacement in a direction generally perpendicular to the widthwise direction of the vehicle chassis. This connecting member may be hingedly and yieldingly connected to either a portion of the wheel carrier substantially intermediately between the front and rear portions thereof or to a portion of the front arm adjacent the wheel carrier.

In addition to the foregoing feature, the present invention is also featured in that the journal or axle of the wheel carrier for the support of the wheel thereon protrudes outwardly from the wheel carrier in a direction opposite to any one of the front and rear arms at a position spaced a smaller distance from the joint of the one end of the front arm to the front portion of the wheel carrier than from the joint of the one end of the rear arm to the rear portion of the wheel carrier.

According to the present invention, since the distance between the longitudinal axis of the wheel journal or axle and the joint of the one end of the front arm to the front portion of the wheel carrier is smaller than the distance between the longitudinal axis of the wheel journal or axle and the joint of the one end of the rear arm to the rear portion of the wheel carrier, the tendency of the wheel to toe out which occurs particularly during the cornering and/or the lateral displacement of the vehicle superstructure by the force of the lateral wind can advantageously be counteracted by the tendency of the same wheel to toe in.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
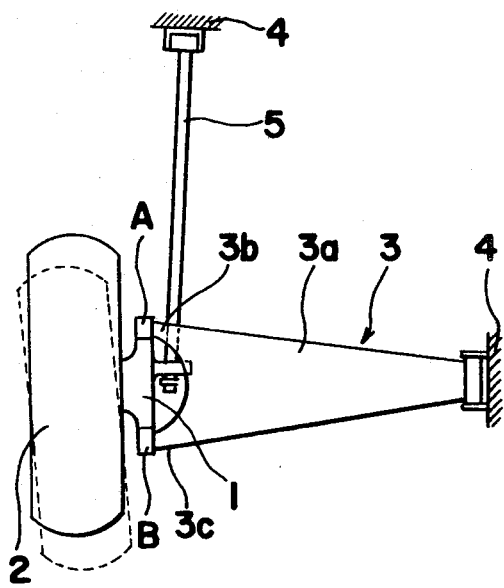
FIG. 1 is a schematic plan view of the prior art rear axle suspension, reference to which has already been made.

Before the description of the present invention proceeds, it is to be noted that like parts are designated by like reference numerals throughout the accompanying drawings. It is also to be noted that, for the sake of brevity, the present invention will be described in connection with the only rear wheel suspension used to support the left-hand rear wheel of an at least three-wheeled motor vehicle.

Referring to the accompanying drawings, particularly, to FIGS. 2 to 5, the independent rear wheel suspension embodying the present invention comprises a wheel support and a shock absorber which are respectively generally identified by WS and Sa. The wheel support WS comprises a wheel carrier 1 having first and second bearing shafts $1a$ and $1b$ extending in coaxial relation to each other in a direction opposite to each other. These first and second bearing shafts $1a$ and $1b$ may be constituted by either the opposed end portions of a single rod member extending through the body of the wheel carrier 1 or separate shaft members formed integrally with or otherwise rigidly connected to the body of the wheel carrier 1. The wheel carrier 1 also has a lateral projection $1c$ which provides a seat for the shock absorber SA as will be described later.

The wheel carrier 1 includes a journal or axle $1d$ protruding outwardly from the wheel carrier 1 in a direction opposite to the lateral projection $1c$ as will be detailed later.

Figure 4:
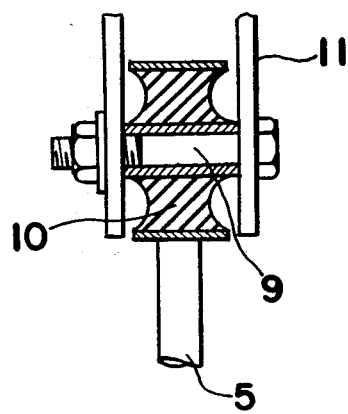
FIG. 4 is a longitudinal sectional view, on an enlarged scale, showing the manner of connection of a connecting rod to a wheel carrier in the rear wheel suspension shown in FIG. 2.
Figure 5:
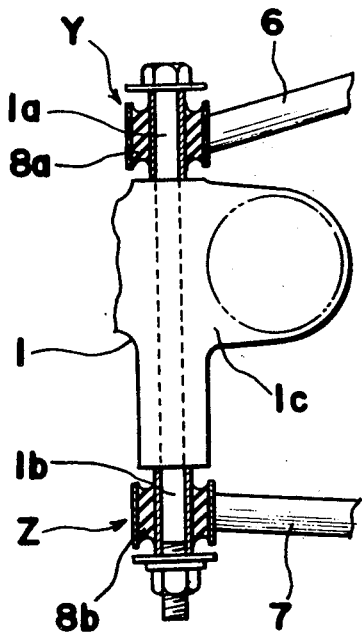
FIG. 5 is a longitudinal sectional view, on an enlarged scale, showing the manner of connection of front and rear arms to the wheel carrier in the rear wheel suspension shown in FIG. 2.

The wheel support WS further comprises first and second transverse arms 6 and 7 extending in spaced relation to each other between the wheel carrier 1 and the chassis 4 in a manner which will now be described. The first and second transverse arms 6 and 7 have their respective first ends hingedly and yieldingly mounted at Y and Z on the bearing shafts $1a$ and $1b$ by means of corresponding bushings $8a$ and $8b$ of elastic material such as rubber as best shown in FIG. 5. In this arrangement, it is clear that, while the first and second arms 6 and 7 are freely rotatable about the associated bearing shafts $1a$ and $1b$, they can be pivotable through a certain angle in any direction in a plane parallel to the longitudinal axis of any one of the bearing shafts $1a$ and $1b$ because of the elasticity of the elastic bushings $8a$ and $8b$. The first and second arms 6 and 7 also have respective second ends opposite to the first ends thereof which are hingedly and yieldingly connected at W and X to front and rear lateral portions of the vehicle chassis 4 in a manner similar to the connection of the first ends of the first and second arms 6 and 7 to the associated bearing shafts $1a$ and $1b$ as shown in FIG. 4, substantially intermediate portions of said first and second arms 6 and 7 extending in spaced relation to each other with the space therebetween gradually increasing as they extend outwardly from the wheel carrier 1. With the arms 6 and 7 extending so as to diverge from each other as described above, the longitudinal straight distance M, as measured in the direction longitudinally of the vehicle chassis 4 between a vertical plane perpendicular to the longitudinal axis of the bearing shafts $1a$ and $1b$ and containing the joint Y and a vertical plane perpendicular to the longitudinal axis of the bearing shafts $1a$ and $1b$ and containing the joint Z, is smaller than the longitudinal straight distance N as measured in the direction longitudinally of the vehicle chassis 4 between a vertical plane generally perpendicular to the longitudinal axis of the vehicle chassis 4 and containing the joint W and a vertical plane generally perpendicular to the longitudinal axis of the vehicle chassis 4 and containing the joint X.

It is to be noted that the position of the wheel carrier 1 from which the wheel journal or axle $1d$ extends outwardly is spaced a smaller distance from the joint Y than from the joint Z. In other words, the distance Da between the joint Y and the longitudinal axis of the wheel journal or axle 1d is smaller than the distance Db between the joint Z and the longitudinal axis of the wheel journal or axle 1d.

Figure 3:
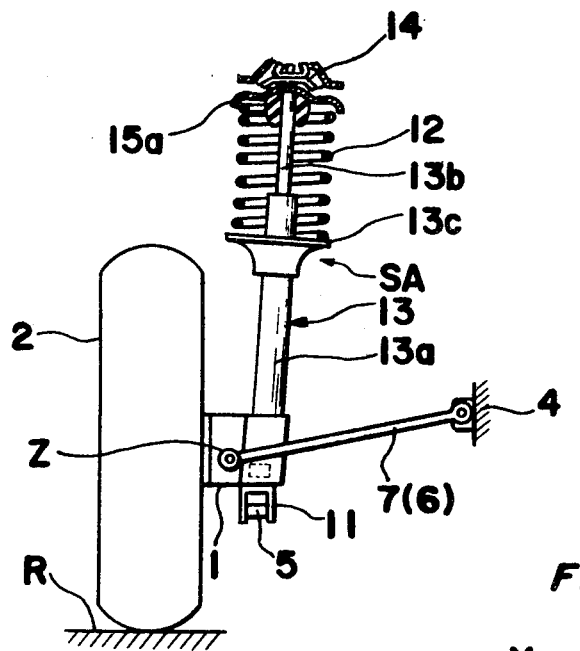
FIG. 3 is a rear elevational view of the rear wheel suspension shown in FIG. 2.

The wheel support WS further comprises a connecting member which is shown in the form of a tension rod 5, having one end hingedly and yieldingly connected to a front portion of the vehicle chassis 4 and the other end hingedly and yieldingly mounted on a cross bar 9 by means of an elastic bushing 10 as best shown in FIG. 4, said cross bar 9 being suspended from the lateral projection 1c of the wheel carrier 1 by means of a bracket 11 which is secured to said lateral projection 1c at a position opposite to the shock absorber SA as best shown in FIG. 3. A substantially intermediate portion of the tension rod 5 extends in a direction generally transversely of any one of the first and second arms 6 and 7. It is to be noted that the joint of the first mentioned end of the tension rod 5 to the front portion of the vehicle chassis 4 is similar to that of the second mentioned end of the tension rod 5 to the bracket 11 as shown in FIG. 4. As best shown in FIG. 4, the cross bar 9 may be in the form of a bolt and nut. It is also to be noted that, because of the employment of the elastic bushings at the respective joints between the first mentioned end of the tension rod 5 and the front portion of the vehicle chassis 4 and between the second mentioned end of the tension rod 5 and the bracket 11, the wheel carrier 1 can be displaceable elastically in a direction longitudinally of the vehicle chassis 4.

Referring particularly to FIG. 3, the shock absorber SA so far illustrated may be of any known construction and is shown as comprising a coil spring 12 and a telescopically extendable strut 13. The strut 13 includes a sleeve 13a having one end formed integrally with, or otherwise non-removably seated on, the lateral projection 1c of the wheel carrier 1, and a piston rod 13b having one end telescopically movably inserted in the sleeve 13a and the other end universally movably connected to an overhanging portion of the vehicle chassis 4, the piston rod 13b being normally biased outwardly relative to the sleeve 13a by the action of the coil spring 12 which is interposed between a spring seat 15a, connected to the overhanging portion of the vehicle chassis 4 through a rubber cushion 14 in coaxial relation to the piston rod 13b, and an annular flange 13c integral or fast with the sleeve 13a.

It is to be noted that the shock absorber SA may not be limited to such a construction as shown, but may be constituted solely by a coil spring or hydropneumatic device, or by a combination thereof.

Figure 2:
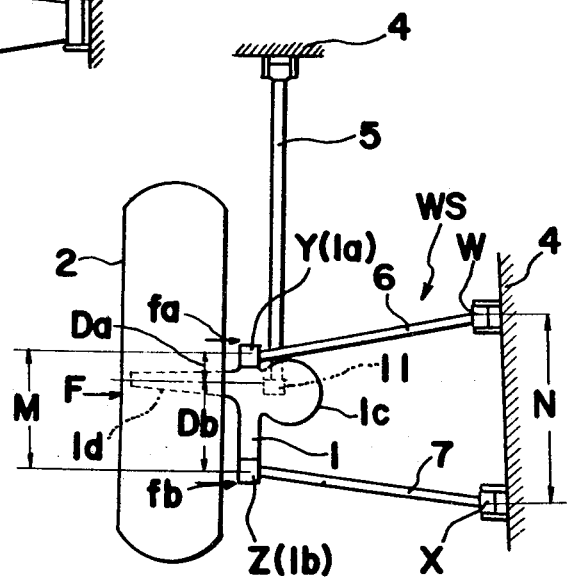
FIG. 2 is a schematic top plan view of a rear wheel suspension embodying the present invention.

The operation of the rear wheel suspension of the construction hereinbefore described will now be described with particular reference to FIG. 2.

Assuming that the vehicle rounds the curve and/or the vehicle receives the force of wind blowing in a direction generally transversely of the vehicle, the pressure of contact of the wheel on the leading side with respect to the direction in which the centrifugal force and/or the wind force acts is increased. Simultaneously therewith, the increased camber thrust acts on the wheel on the leading side in a direction as shown by the arrow F. This camber thrust F is distributed to the first and second arms 6 and 7 through the wheel carrier and, however, since the distance Da is smaller than the distance Db as hereinbefore described, the component of the camber thrust acting on the first arm 6 in a manner as shown by the arrow fa in FIG. 2 is larger than the component of the same camber thrust acting on the second arm 7 in a manner as shown by the arrow fb in FIG. 2. This means that the moment of the first arm 6 tending to pivot counterclockwise as viewed in FIG. 2 about the joint W becomes larger than the moment of the second arm 7 tending to pivot clockwise as viewed in FIG. 2 about the joint X and, therefore, the wheel 2 as a whole is displaced rearwardly of the vehicle. However, during the rearward displacement of the wheel 2 taking place in the manner described above, the joint Y is shifted in a direction obliquely inwardly of the vehicle chassis 4 while the joint Z is shifted in a direction obliquely outwardly of the vehicle chassis 4 and, consequently, the possibility of the toe-out of the wheel 2 can advantageously be avoided, or the tendency of the wheel 2 to toe in is increased.

Although the present invention has fully been described in connection with the preferred embodiment thereof with reference to the accompanying drawings, it is to be noted that various changes and modifications are apparent to those skilled in the art. By way of example, although in the foregoing description the tension rod 5 has been described as connected to the lateral projection 1c through the bracket 11, it may be connected to a portion of the first arm adjacent the wheel carrier. Moreover, the concept of the present invention can equally be applicable to the wheel suspension wherein the front and rear arms extend between the wheel carrier and the chassis in parallel or approximately parallel relation to each other.

Therefore, such changes and modifications are to be understood as included within the true scope of the present invention unless they depart therefrom.

We claim:

1. In a wheel suspension for a vehicle having a vehicle chassis, which comprises a wheel support including a wheel carrier, said wheel carrier having a wheel journal for the support of a wheel for rotation independently of the wheel carrier, front and rear arm members extending between the wheel carrier and the vehicle chassis in spaced relation to each other in a direction generally laterally of the vehicle chassis, the front arm member having a first end hingedly and yieldingly connected to a front portion of the wheel carrier and a second end hingedly and yieldingly connected to a front lateral portion of the vehicle chassis and the rear arm member has a first end hingedly and yieldingly connected to a rear portion of the wheel carrier and a second end hingedly and yieldingly connected to a rear lateral portion of the vehicle chassis, a connecting member for elastically connecting the wheel support to the vehicle chassis for displacement in a direction generally perpendicular to the widthwise direction of the vehicle chassis, and a shock absorber means for absorbing vibrations of the wheel carrier which take place in a direction at right angles to the road surface during the running of the vehicle, the improvement wherein said journal extends outwardly from the wheel carrier in a direction opposite to any one of the front and rear arm members at a position spaced a smaller distance from the joint of the first end of the front arm member to the front portion of the wheel carrier than the distance from the joint of the first end of the rear arm member to the rear portion of the wheel carrier.

2. A wheel suspension as claimed in claim 1, wherein said connecting member comprises a tension rod having one end adjacent the wheel support hingedly and yieldingly connected to the wheel carrier and the other end hingedly and yieldingly connected to a front portion of the vehicle chassis.

3. A wheel suspension as claimed in claim 1, wherein said shock absorber is positioned between the wheel carrier and an overhanging portion of the vehicle chassis.

* * * * *